United States Patent
Foch et al.

(10) Patent No.: US 7,031,810 B2
(45) Date of Patent: Apr. 18, 2006

(54) CONTROL SYSTEM AND PROCESS FOR SEVERAL ACTUATORS

(75) Inventors: Etienne Foch, Toulouse (FR); Christophe Fleury, Vacguiers (FR)

(73) Assignee: Airbus France, (FR)

(*) Notice: Subject to any disclaimer, the term of this patent is extended or adjusted under 35 U.S.C. 154(b) by 37 days.

(21) Appl. No.: 10/409,761

(22) Filed: Apr. 8, 2003

(65) Prior Publication Data

US 2003/0195673 A1 Oct. 16, 2003

(30) Foreign Application Priority Data

Apr. 10, 2002 (FR) .................... 02 04465

(51) Int. Cl.
*G05D 27/02* (2006.01)

(52) U.S. Cl. ............................ 701/3; 307/9.1; 244/75.1

(58) Field of Classification Search ............... 701/3, 701/39; 244/195, 75 R, 160, 75.1; 700/22, 700/21, 20
See application file for complete search history.

(56) References Cited

U.S. PATENT DOCUMENTS

| | | | |
|---|---|---|---|
| 4,403,292 A * | 9/1983 | Ejzak et al. ................. 700/297 |
| 5,170,352 A * | 12/1992 | McTamaney et al. ......... 701/26 |
| 5,491,625 A * | 2/1996 | Pressnall et al. ............... 700/4 |
| 5,515,282 A * | 5/1996 | Jackson .......................... 701/4 |
| 5,764,502 A * | 6/1998 | Morgan et al. ................ 363/65 |
| 5,936,318 A * | 8/1999 | Weiler et al. .................. 307/66 |
| 6,223,104 B1 * | 4/2001 | Kamen et al. .................. 701/1 |
| 6,295,006 B1 * | 9/2001 | Kohlhepp .................... 340/946 |
| 2002/0068655 A1* | 6/2002 | Yamada et al. ................. 475/5 |
| 2002/0156556 A1* | 10/2002 | Ruffner ....................... 701/23 |
| 2002/0161488 A1* | 10/2002 | Guillemin et al. ............. 701/3 |

FOREIGN PATENT DOCUMENTS

| | | |
|---|---|---|
| DE | 37 26489 A1 | 2/1989 |
| DE | 44 16 795 A1 | 11/1995 |
| EP | 0 229 559 A1 | 7/1987 |
| EP | 0 987 612 A1 | 3/2000 |
| EP | 1 035 459 A1 | 9/2000 |
| WO | 87/07967 | 12/1987 |

* cited by examiner

*Primary Examiner*—Thomas G. Black
*Assistant Examiner*—Christine M. Behncke
(74) *Attorney, Agent, or Firm*—Thelen Reid & Priest LLP

(57) ABSTRACT

This invention relates to a system for controlling several actuators (A11, . . . , Anr), comprising at least two computers (L1, L2, . . . , Lk) and at least two means (C1, C2, . . . , Cn) of controlling at least one actuator, each control module being capable of controlling at least one actuator through at least one first connection (16) and being capable of receiving information about this at least one actuator through at least one second connection (15), in which each control module is connected to at least two computers through at least two first communication buses (11, 12, 13).

14 Claims, 3 Drawing Sheets

CONTROL SYSTEM AND PROCESS FOR SEVERAL ACTUATORS

CROSS REFERENCE TO RELATED APPLICATIONS

This application claims priority to French Patent Application Serial No. 02 04465 entitled "Control System and Process For Several Actuators" by FOCH, Entienne et al. filed on Apr. 10, 2002.

TECHNICAL FIELD

This invention relates to a system and process for the control of several actuators, particularly in the case in which at least one parameter related to at least one first actuator must be taken into account before controlling the state change of at least one second actuator.

The system and process according to the invention are useable particularly in aeronautics.

STATE OF PRIOR ART

In aeronautics, particularly in the case of an electrical aircraft generation device, there are several known solutions for controlling contactors; one solution consists of using a relay logic. An improved variant of this solution consists of using a programmable logic circuit including all necessary logic functions, particularly making it possible to take account of constraints related to the state of some contactors.

But there are several disadvantages with this solution:

- when this solution uses an actuator control logic, redundant controls of these actuators are necessary to improve functional dependability, but it is complicated in practice and is therefore difficult to envisage;
- this type of solution cannot be upgraded; when a new actuator is to be provided, if a relay logic is used, relays have to be added and modifications to the wiring have to be made accordingly, or if a programmable logic circuit is used the control device needs to be replaced by another control device comprising inputs and outputs necessary for controlling this new actuator;
- in some cases, for example for maintenance, this solution makes it impossible to make measurements and transmit information related to the operation of the actuators considered, for example information about voltages, currents, temperatures, etc. Therefore, this information is necessary elsewhere. Sensors appropriate for the magnitudes to be measured and a communication bus can be used to measure and transmit this type of information. But the use of this type of additional means may be completely incompatible when dimensional and weight criteria have to be respected, for example in aeronautics. Furthermore in this field, frequently used buses such as the ARINC 429 bus may necessitate a large number of physical connections, particularly when the said information has to be transmitted to several computers in the case of a redundant system.

The purpose of this invention is to overcome these disadvantages by proposing a system and a process for controlling these actuators, this system being structured redundantly to have a good functional dependability controlled by several computers.

PRESENTATION OF THE INVENTION

This invention relates to a system for controlling several actuators, comprising at least two computers and at least two means of controlling at least one actuator, each control module being capable of controlling at least one actuator through at least one first connection and being capable of receiving information about this at least one actuator through at least one second connection, characterized in that each control module is connected to at least two computers through at least two first communication buses.

Advantageously, the computers are connected to each other through at least one second communication bus.

This invention also relates to a process for controlling several actuators, in a system comprising at least two computers and at least two modules for the control of at least one actuator, each control module being capable of controlling at least one actuator through at least one first connection and being capable of receiving information related to this at least one actuator through at least one second connection, characterized in that at least two control modules are used that make decisions related to control of the actuators that they control as a function of information received from several computers, and in that each computer can use information output from the control modules connected to it, calculates set values as a function of this information, and sends these set values to the said control modules.

Advantageously, the computers work independently and asynchronously.

In a first advantageous embodiment, the system according to the invention is used to control the electrical generation system of an aircraft.

In a second advantageous embodiment, the system according to the invention is used to control the flaps of an aircraft.

The system according to the invention can solve many existing problems in systems according to known art, and has the following advantages:

- It has a high degree of functional dependability and robustness due to the redundancy of the computers and the connections between these computers and the actuator control modules, and due to the fact that, in the preferred embodiment of the invention, each computer provides its information for use by other computers.
- It provides a means of controlling actuators and retrieving information related to them (state, measurements, etc.) at the same time. Advantageously, this information may also be used for maintenance.
- It is very flexible for upgrading; when a new actuator has to be controlled, all that is necessary is to add a control module for this actuator, connect this control module to appropriate computers using communication buses, and modify the programming of the said computers so that they control this actuator.

The system according to the invention can also be used whenever several actuators have to be controlled by an intelligent system and when it is necessary to have high operating dependability and availability, for example for automobiles, machine tools, etc.

DETAILED PRESENTATION OF PARTICULAR EMBODIMENTS

Figure 1:
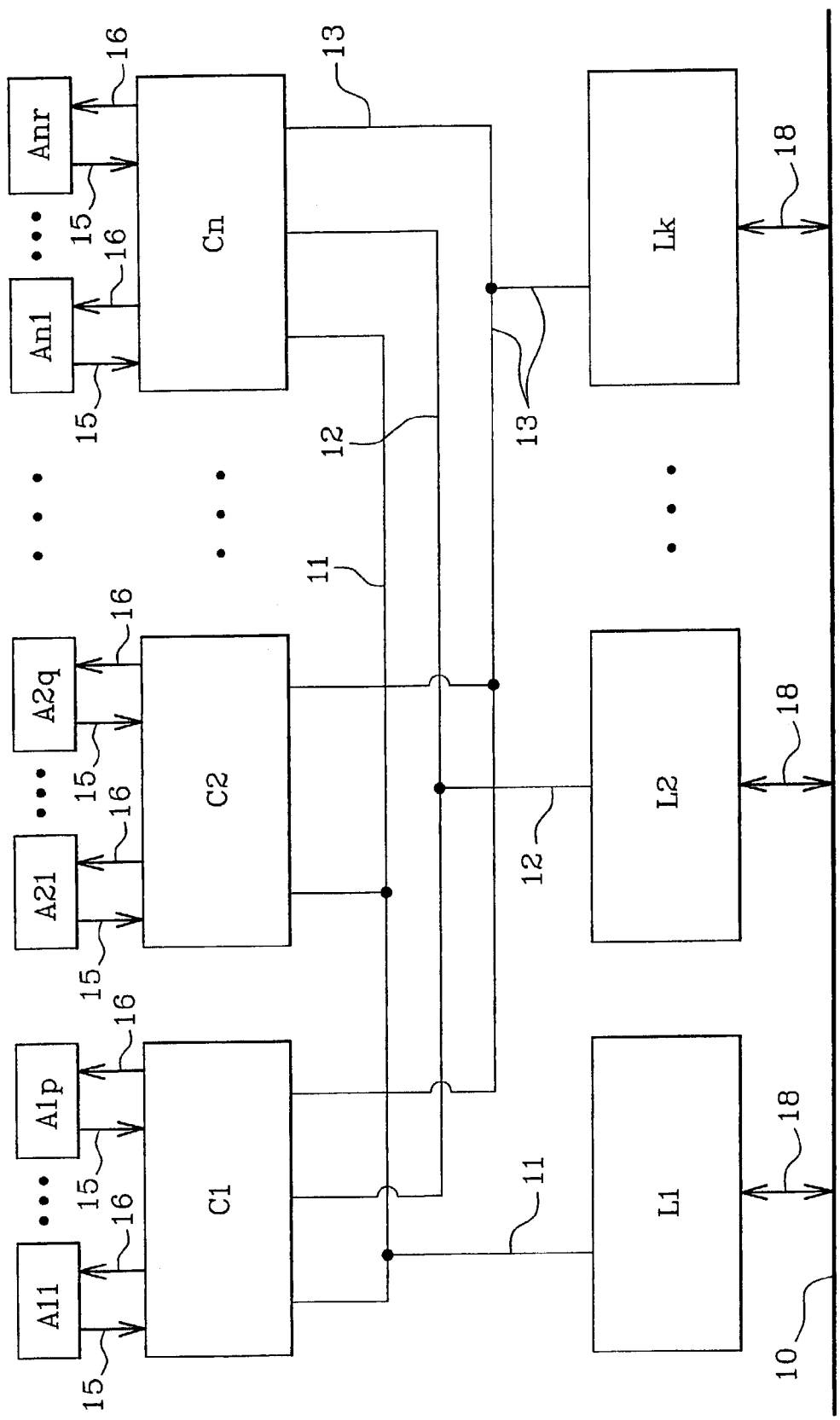
FIG. 1 illustrates an embodiment of the control system according to the invention.

As illustrated in FIG. 1, the system according to the invention comprises at least two control modules C1, C2, . . . , Cn, at least one actuator A11, . . . , A1p; A21, . . . , A2q, . . . , An1, . . . , Anr and at least two computers L1, . . . , Lk. Each computer is connected to at least one of the control modules through a first communication bus 11, 12 or 13. These computers L1, L2, . . . , Lk may advantageously be connected to each other through at least one second communication bus 10.

Each control module Ci ($1 \leq i \leq n$) controls at least one actuator by controlling the state of the said actuator using at least one first connection 16. The said control module may receive information from the said actuator, or at least from a sensor associated with it, using at least one second connection 15. For example, this may be information related to the state of the contactor (dry contact), the measurement of the voltage at the terminals of the said contactor, the measurement of the current passing through it, the temperature, etc.

Each control module Ci comprises at least one information processing unit, for example a computer or a microcontroller, capable of controlling the actuator(s) corresponding to the means of the first connection(s) 16 as a function of set values received from at least one computer L1, . . . , Lk, and secondly providing information about this or these corresponding actuators received from the second connection(s) 15, to at least one computer through a communication bus 11, 12 or 13.

The processing unit in each control module decides upon control actions for the corresponding actuator(s), particularly as a function of information received from the computers taking account of whether or not this information is consistent, whether or not there is any dialogue, and if there are any communication errors between one or more computers.

The control modules Ci are not necessarily connected to all computers. Thus, the control module C2 in the figure is not connected to computer L2. The number of computers L1, L2, . . . , Lk to which a control module is connected is usually chosen as a function of the required functional dependability for this control module; the functional dependability is higher when this number is higher. Thus, it is possible to connect one or several control modules controlling actuators for which the state is not critical for the entire system, to a single computer.

The fact that each control module is connected to several computers through communication buses 11, 12 and 13 can give good functional dependability of the system according to the invention due to redundancy of the computers to which the control module is connected, and also the connections made through these buses 11, 12 and 13.

Advantageously, computers L1, L2, . . . , Lk operate independently and asynchronously. Each computer can use information from the control modules to which it is connected through buses 11, 12 or 13. It uses information available to it and calculates set values that it sends to these different control modules.

Unlike some known systems, the system according to the invention does not have a computer monitoring entity that it can use to decide whether or not to validate one or several computers at a given moment.

Unlike systems according to known art, decisions related to the control of actuators will be taken by the processing unit for each control module as a function of information received from it from the different computers. For example, the said decisions may be decided upon by a voting system integrated into the said processing units. Such a characteristic is very useful since, by thus transferring the decision to the end of the information processing sequence, the system becomes highly modular and the functional dependability can be improved with regard to a computer failure or to the failure of one or several connections between computers and control modules.

In the preferred embodiment of the invention as illustrated in the figure, each computer L1, L2, . . . , Lk is connected to the communication bus 10 through a connection 18. Each computer uses this bus to enable other computers to access information that it collected from control modules to which it is connected through one of the buses 11, 12 or 13.

This operating embodiment has many advantages, and particularly:

- a computer can access information originating from all actuators, even if connections between this computer and the actuator control modules are interrupted. This computer can thus continue to calculate set values corresponding to the different actuators and can send set values related to actuators controlled by control modules for which the connection with the said computer is not interrupted, on its communication bus 11, 12 or 13;
- independence of the different computers L1, L2, . . . , Lk eliminates the risk of failure due to a synchronization fault between the said computers.

In one advantageous embodiment, the buses 11, 12 and 13 may for example be CAN (Control Area Network) communication buses, or a similar type.

Figure 2:
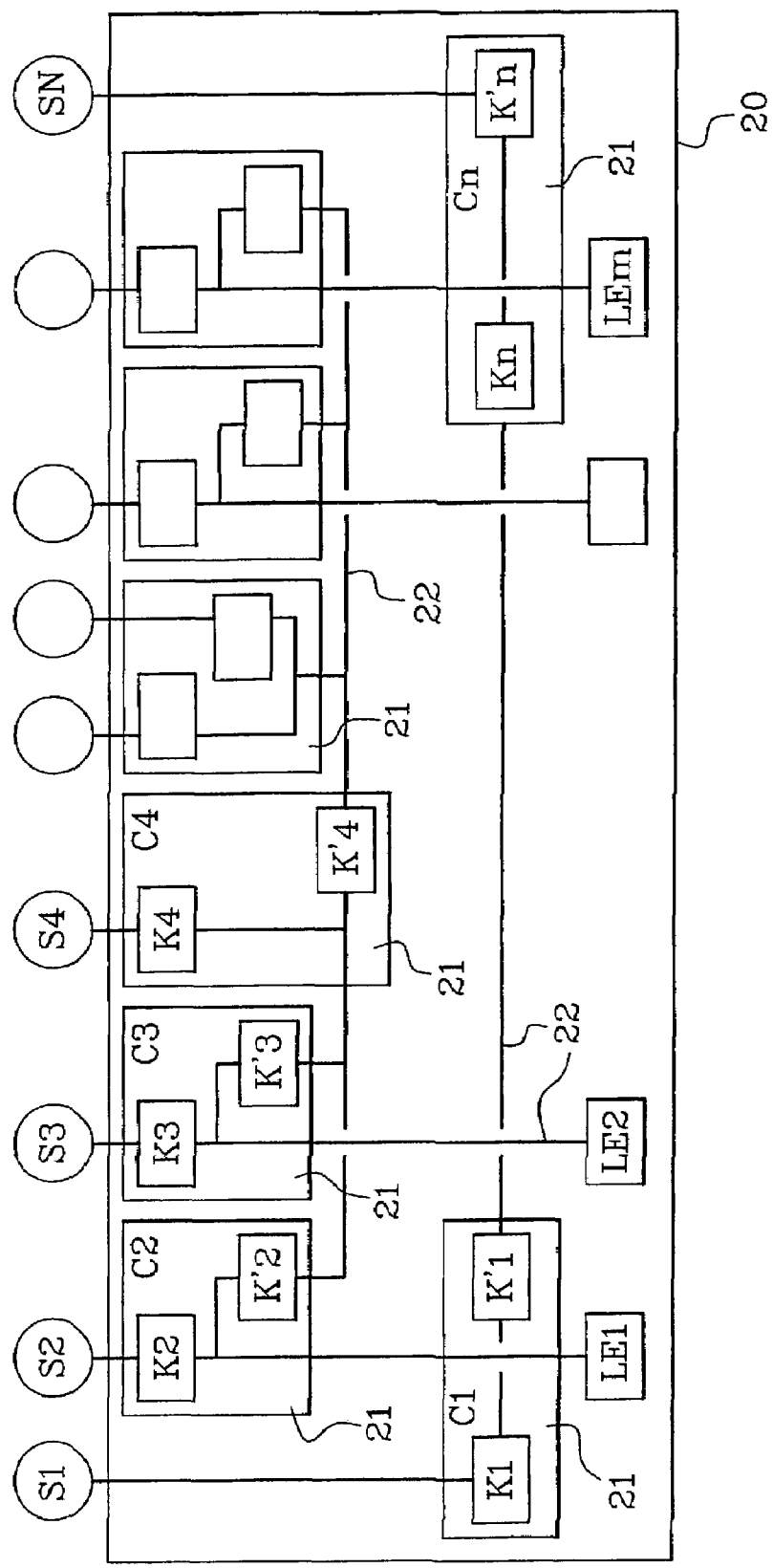
FIGS. 2 and 3 illustrate an embodiment of the system according to the invention.
Figure 3:
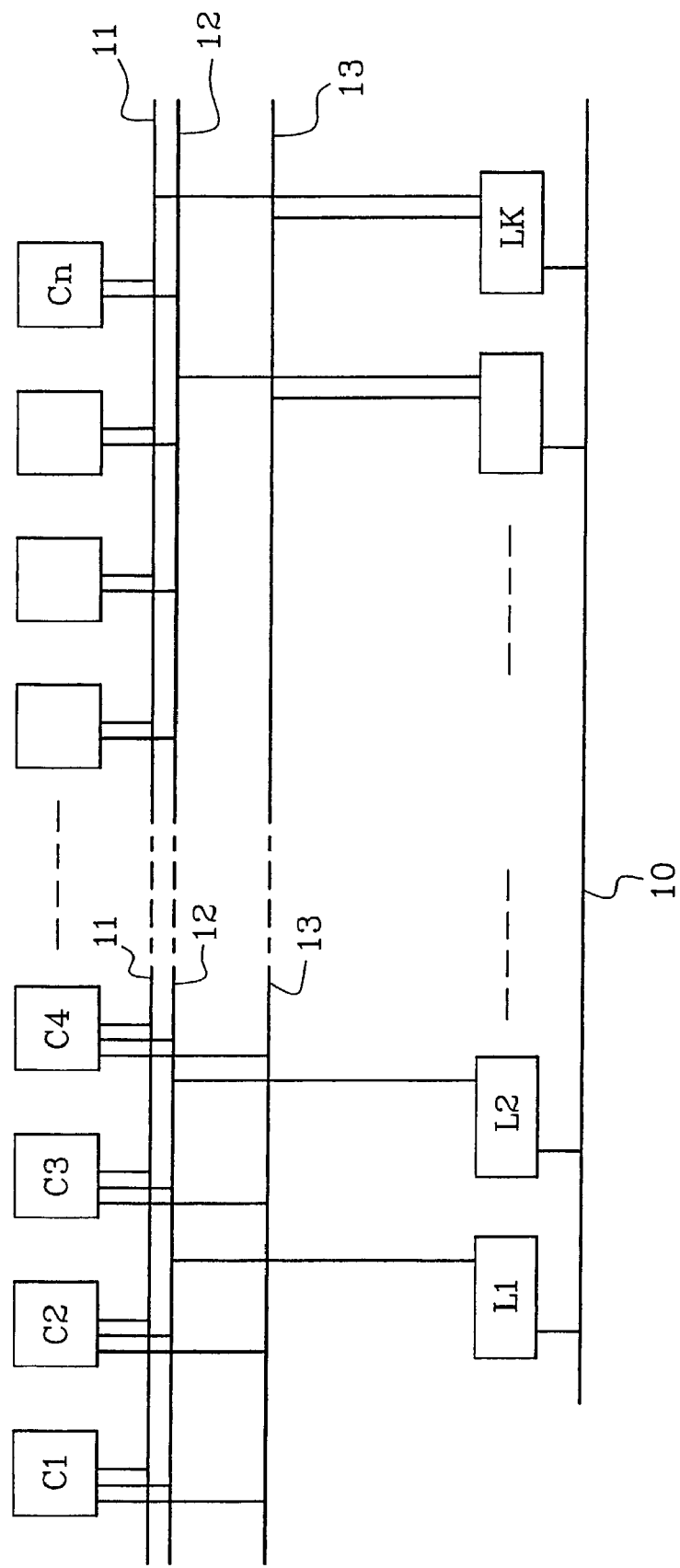

FIGS. 2 and 3 illustrate an embodiment of the system according to the invention. FIG. 2 represents the distribution of electrical power using circuits of two contactors, and FIG. 3 shows the connection of the said circuits to control computers using communication networks (for example using CAN buses).

More precisely, FIG. 2 illustrates the primary AC communication of a demonstrator made in an "electrical core" 20 with electrical sources/generators S1 to Sn, primary AC circuits 21 of two contactors (K1, K'1) to (Kn, K'n) comprising controls for these contactors referenced C1, . . . , Cn, and electrical distribution lines LE1 to Lem, for example where m=4, the current lines being referenced 22.

FIG. 3 illustrates the control/communication for the primary AC distribution with control modules C1, . . . Cn illustrated in FIGS. 1 and 2, each connected to communication networks 11, 12, 13 as shown in FIG. 1, to which the computers L1, L2, . . . , Lk are connected, the computers being connected to each other through an inter-computer network 10.

We will now consider two advantageous embodiments related to aeronautics.

In a first embodiment, the system according to the invention is used to control an electrical generation system for an aircraft. In this case, the actuators may be electrical contactors. Information acquired by the control modules then corresponds to the state of the said contactors, to voltage, current measurements, etc. The system according to the invention is particularly suitable for this type of application since some contactors must be controlled taking account of the state of other contactors, while respecting the sequential chaining of different states of the said contactors.

In a second embodiment, the system according to the invention is used to control the flaps of an aircraft, which are usually actuated by a set of jacks. The various jacks actuating a single flap must be controlled such that they are consistent with each other. Furthermore, the corresponding positions of the different flaps must be controlled in a synchronized manner in order to respect conditions related to the aerodynamics of the said aircraft. Therefore in this example, in particular, the actuators are the said jacks, some of the information measurements then correspond to the position of the said jacks. The system according to the invention is particularly suitable for controlling flaps of this type.

The invention claimed is:

1. System for controlling the electrical generation system of an aircraft, said system comprising:
    a plurality of actuators for the electrical generation system of the aircraft, said actuators controlling distinct outputs;
    at least two computers; and
    at least two modules for controlling at least one actuator, each control module being capable of controlling at least one actuator through at least one first connection and being capable of receiving information about said at least one actuator through at least one second connection, wherein each control module is connected to at least two computers through at least two first communication buses.

2. System according to claim 1, in which the computers are connected to each other through at least one second communication bus.

3. System according to claim 2, wherein each computer is connected to a communication bus through a connection.

4. System according to claim 1, wherein buses are CAN buses.

5. System according to claim 1, comprising electrical sources/generators, primary AC circuits of two contactors, controls for these contactors, and electrical distribution lines.

6. System according to claim 1, wherein the control modules are connected to communication networks, to which the computers are connected, the computers being connected to each other through an inter-computer network.

7. System according to claim 1, wherein actuators are electrical contactors.

8. System according to claim 1, wherein if a connection between a computer and an actuator is interrupted, said connection providing information concerning said actuator, said computer is capable of receiving the information concerning said actuator from another computer which is linked to said actuator.

9. Process for controlling the electrical generation system of an aircraft in a system comprising a plurality of actuators, at least two computers, and at least two modules for controlling at least one of said plurality of actuators for the electrical generation system of the aircraft, each control module being capable of controlling at least one actuator through at least one first connection and being capable of receiving information related to this at least one actuator through at least one second connection, wherein at least two control modules are used that make decisions related to control of the actuators that they control as a function of information received from several computers, and wherein each computer is capable of using information output from the control modules connected to it, calculates set values as a function of this information, and sends these set values to the said control modules, and wherein said actuators control distinct outputs of the electrical generation system of the aircraft.

10. Process according to claim 9, in which the computers work independently and asynchronously.

11. Process according to claim 9, wherein each computer is capable of accessing information originating from all actuators, even if connections between this computer and the actuator control modules are interrupted, and wherein said computer is capable of continuing to calculate set values corresponding to the different actuators and capable of sending set values related to actuators controlled by control modules for which the connection with said computer is not interrupted, on its communication bus.

12. Process according to claim 9, wherein if a connection between a computer and an actuator is interrupted, said connection providing information concerning said actuator, said computer is capable of receiving the information from another computer which is linked to said actuator.

13. Process for controlling the electrical generation system of an aircraft in a system comprising a plurality of actuators, at least two computers, and at least two modules for controlling at least one actuator, said process comprising:
    controlling, using the control module, at least one of said plurality of actuators for the electrical generation system of the aircraft through at least one first connection;
    receiving, at the control modules, information related to said at least one actuator through at least one second connection;
    making, using at least two control modules, decisions related to control of the actuators that they control, as a function of information received from several computers;
    calculating, at the computers, set values as a function of information output from the control modules connected thereto,
    sending the set values to the control modules; and
    controlling, using the actuators, distinct outputs of the electrical generation system of the aircraft.

14. Process according to claim 13, if a connection between a computer and an actuator is interrupted, said connection providing information concerning said actuator, said process further comprising:
    receiving, at said computer, the information concerning said actuator from another computer which is linked to said actuator.

* * * * *